United States Patent [19]
Webb

[11] 4,293,992
[45] Oct. 13, 1981

[54] DIESEL FUEL INJECTOR TOOL

[76] Inventor: James E. Webb, 13809 Hershie, Houston, Tex. 77015

[21] Appl. No.: 76,149

[22] Filed: Sep. 17, 1979

[51] Int. Cl.[3] .............................................. B23P 19/04
[52] U.S. Cl. ...................................................... 29/267
[58] Field of Search ................. 29/267, 280, 256, 268, 29/244

[56] References Cited

U.S. PATENT DOCUMENTS

| | | | |
|---|---|---|---|
| 2,491,132 | 12/1949 | Pothier et al. | 29/267 |
| 3,061,915 | 11/1962 | Puryear | 29/267 |
| 3,670,389 | 6/1972 | Shepanski | 29/256 |
| 4,110,886 | 9/1978 | Wendler et al. | 29/280 |

*Primary Examiner*—Robert C. Watson
*Attorney, Agent, or Firm*—Pravel, Gambrell, Hewitt, Kirk, Kimball & Dodge

[57] ABSTRACT

The invention comprises a tool for removing fuel injectors from diesel engines without damaging any adjacent component parts or user's hands. The invention comprises an elongated member having a U-shaped injector engaging member at one end. The elongated member has a locating pin which is adapted to fit inside one of several bolt holes along side a fuel injector in a diesel engine. The locating pin serves as a pivot for the mechanic to manually lever the injector loose from the diesel engine.

1 Claim, 8 Drawing Figures

Fig. 6
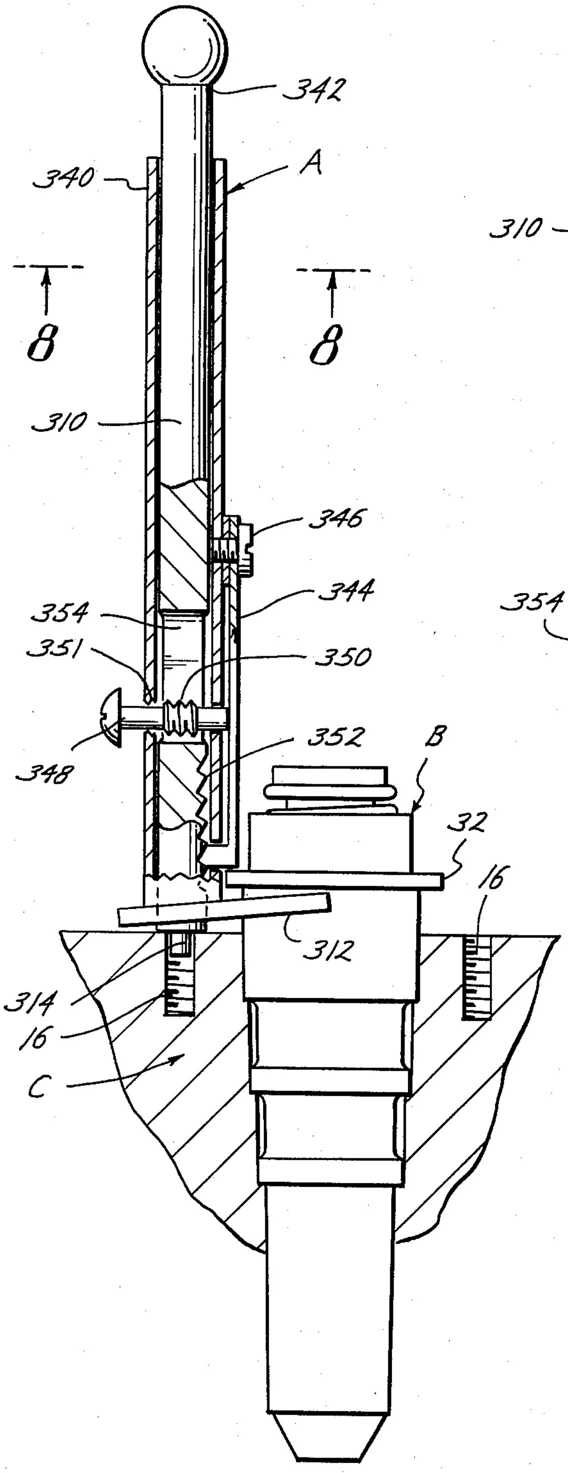
Fig. 7
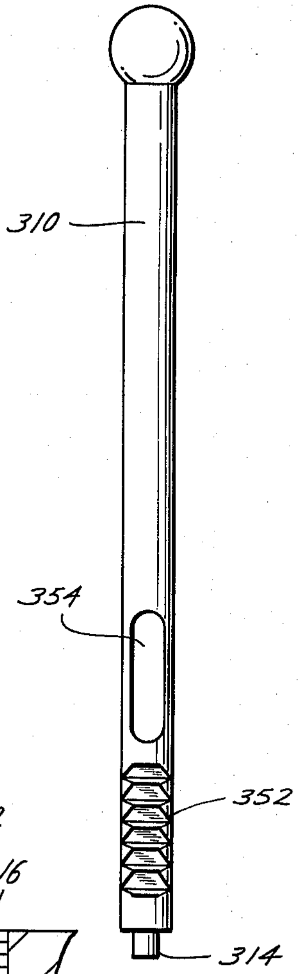
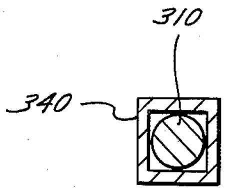
Fig. 8

DIESEL FUEL INJECTOR TOOL

TECHNICAL FIELD OF THE INVENTION

The present invention relates to a tool adapted for removing fuel injectors from diesel engines.

PRIOR ART

Periodically, it is necessary to remove the fuel injectors from diesel engines for cleaning and repair purposes. This removal is quite difficult due to the practically inaccessible location of the fuel injectors in the rocker box of diesel engines.

The normal procedure for removing fuel injectors is to lift the rocker arms and lifters in the rocker box out of the way in order to obtain access to the fuel injector. A pry bar with a hook on one end is a commonly used tool employed to remove fuel injectors. The hooked end of the pry bar is slipped under the lip or collar of the injector and the injector is then pryed loose. Such a pry bar is quite difficult to use inside the tight quarters of the rocker box as it is difficult to obtain sufficient leverage. The lack of leverage becomes even more significant when the injector nozzle commences to move out of its opening. Thus, the mechanic frequently damages adjacent components in the rocker box, as well as his hand. Also, the mechanic must still reach down into the tight quarters of the rocker box with his hand and pull the loosened fuel injector out.

Another tool in the prior art is a slide hammer tool having a spring-loaded pin which snaps out of one side of a rod on the lower portion of the slide hammer. This tool has several inherent disadvantages. First, the mechanic must perform a difficult act requiring considerable coordination by slipping the bottom rod of the slide hammer into the hole in the top of the fuel injector while simultaneously depressing the spring-loaded pin in the rod with a long handled screw driver. The spring-loaded pin then snaps out into a horizontal hole inside the fuel injector.

U.S. Pat. No. 3,670,389 discloses a tool for removing fuel injectors which employs a lifting screw with raises a horizontal pin inserted into the side overflow port of the fuel injector. While such a tool may work well in removing fuel injectors from some diesel engines, it could not be used to pull certain fuel injectors as the overflow port into which the horizontal pin is inserted is not accessible until the injector has been pulled in some versions.

U.S. Pat. Nos. 4,045,856; 3,584,365; and 2,869,225 provide three additional examples of tools for pulling bolts or bearings by the use of a threaded rotatable bolt. Due to close fitting of the rocker box, none of the disclosed tools is very practical for use in pulling fuel injectors from diesel engines.

SUMMARY OF THE INVENTION

The present invention fulfills a significant need in providing a simple, easy to use tool for removing fuel injectors from diesel engines without damaging any adjacent component parts or user's hands. The invention is comprised of an elongated member which is threaded at one end to engage similar threads in an injector engaging member. The roughly U-shaped injector engaging member is formed to fit underneath a collar on fuel injectors which are seated in their bores in diesel engines for removing the injectors. The elongated member has a locating means or pin, which is adapted to fit inside one of several bolt holes alongside a fuel injector in a diesel engine. The locating means in the elongated member serves as a pivot, which is adjustable in height, for the mechanic to manually lever the injector loose from the rocker box. A sliding collar, with an attached pin adapted to be inserted into the injector port at the top of the fuel injector, can be placed around the elongated member, to aid in the removal of the fuel injector from the diesel engine after it has been pryed loose.

BRIEF DESCRIPTION OF THE DRAWINGS

FIG. 6 is a side elevation view, partially in section, illustrating a fourth preferred embodiment of the fuel injector tool;

FIG. 7 is a side elevation view also illustrating the lever rod of FIG. 6; and

FIG. 8 is a cross-sectional view taken along the lines 8—8 of FIG. 6.

DETAILED DESCRIPTION

Figure 1:
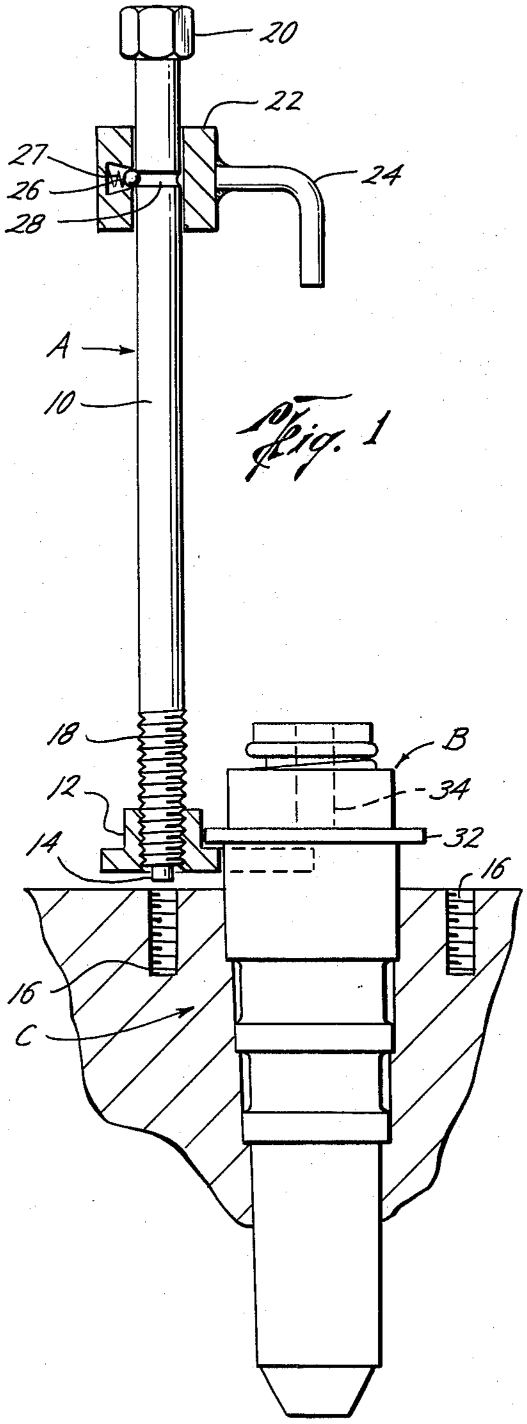
FIG. 1 is a side elevation view, partially in section, illustrating a preferred embodiment of the fuel injector tool and a diesel fuel injector.

FIG. 1 illustrates a preferred embodiment of the fuel injector tool A, relative to a fuel injector B, about to be removed from the rocker box (not illustrated) of a diesel engine C. The tool A includes an elongated member or lever rod 10 which is threadably mounted to an injector engaging or pulling member 12 by means of mating machine threads 18. The injector engaging member 12 is provided with a U-shaped portion adapted to fit between the collar 32 of the fuel injector B and the diesel engine C for pulling the injector B. The injector engaging member 12 is mounted to the lever rod 10 at an angle of less than 90°, preferably 75°-85°. Mounting at less than a right angle provides a greater range of movement in removing fuel injectors from the crowded rocker box.

The lever rod 10 terminates at one end in a locating pin 14 which is machined or formed to fit within bolt holes 16 in the bottom of the rocker box. A nut 20 is mounted at the opposite or second end of the lever rod 10 from the locating means 14 to provide for rotation of the lever rod 10 relative to the engaging member 12. The nut 20 assists in turning the lever rod 10 so that the pivot or fulcrum provided by the locating means 14 can be adjusted relative to the engaging member 12 while extracting or levering out the fuel injector B. Such adjustment is needed to avoid the closely located engine parts in the rocker box and prevent the injector from angling or canting during removal. Also, the mechanical advantage of threads 18 may be used to loosen a particularly difficult injector. Alternatively, a hexagonal head bolt may be used as the lever rod 10, provided that a locating means 14 is machined or formed at the end of the lever rod 10 that will not damage the threads of bolt hole 16.

A retaining collar 22, having an attached pin 24, is slidably mounted on the lever rod 10 to aid in the removal of the fuel injector B from the diesel engines C after the fuel injector B has been levered loose. The pin 24 is adapted to engage the released fuel injector B through injector port 34 at the top of the fuel injector. A detent mechanism is provided at the top of lever rod 10 to hold the sliding collar 22 adjacent to the second end of the lever rod 10 until the fuel injector B has been loosened. The detent mechanism includes a spring 27 urging a ball or detent 26 into a corresponding annular recess or depression 28 in the lever rod 10. The detent mechanism pictured in FIG. 1 is merely one example of the many types of detent mechanisms which can be used in the practice of this invention to maintain the sliding collar 22 at one end of the lever rod 10 until its use is desired.

Figure 2:
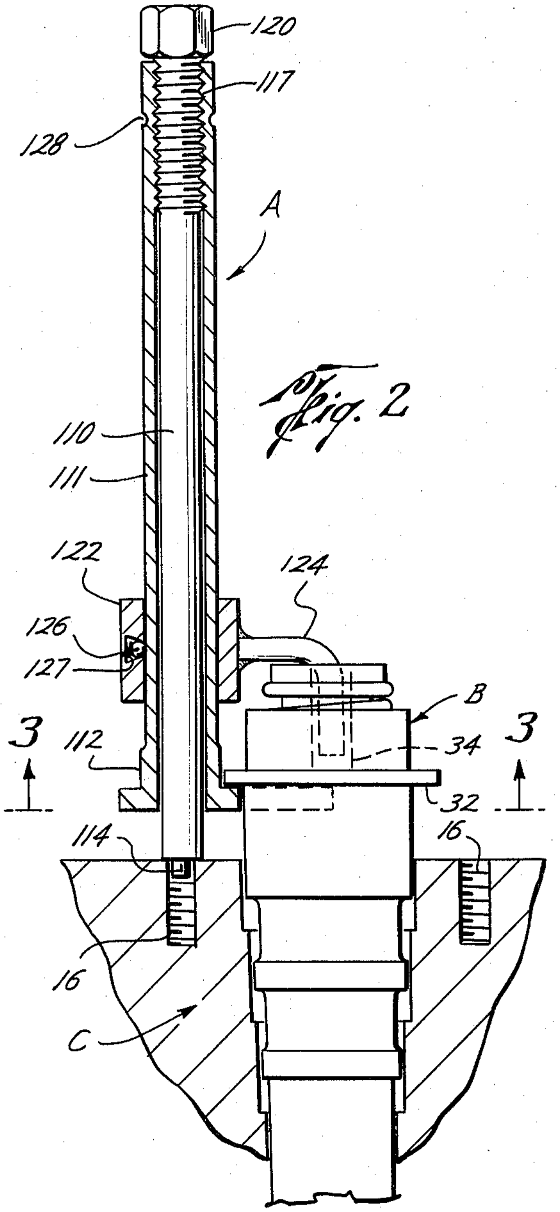
FIG. 2 is a side elevation view, partially in section, illustrating a second embodiment of the fuel injector tool being used to remove a fuel injector.
Figure 3:
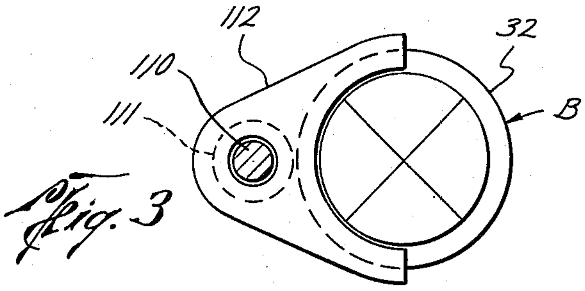
FIG. 3 is a view of the injector engaging member taken along the line 3—3 of FIG. 2.

FIG. 2 illustrates a second embodiment of the fuel injector tool. As a number of components of this embodiment are identical to those employed in the first preferred embodiment, the reference numbers employed will be the same increased by one hundred. In this embodiment, the injector engaging member 112 has an upwardly extending tubular extension 111 fixedly secured thereto and concentrically disposed about the lever rod 110. The lever rod 110 is threadably mounted within the tubular extension 111 by threaded engagement at 117 for maintaining pivot 114 in engagement with the engine C. In FIG. 2, the retaining pin 124 has been moved within the injector port 34 after the fuel injector B has been levered loose. Once the fuel injector has been levered at least partially free of the diesel engine C within the rocker box, the sliding collar 122 and pin 124 may be lowered to engage the fuel injector B so that it can be easily lifted out of the rocker box. As is best illustrated in FIG. 3, the injector engaging member 112 is provided with a U-shaped or bifurcated portion which is adapted to engage the fuel injector B adjacent the engine C and below the collar 32 on the fuel injector B for effecting removal.

Figure 4:
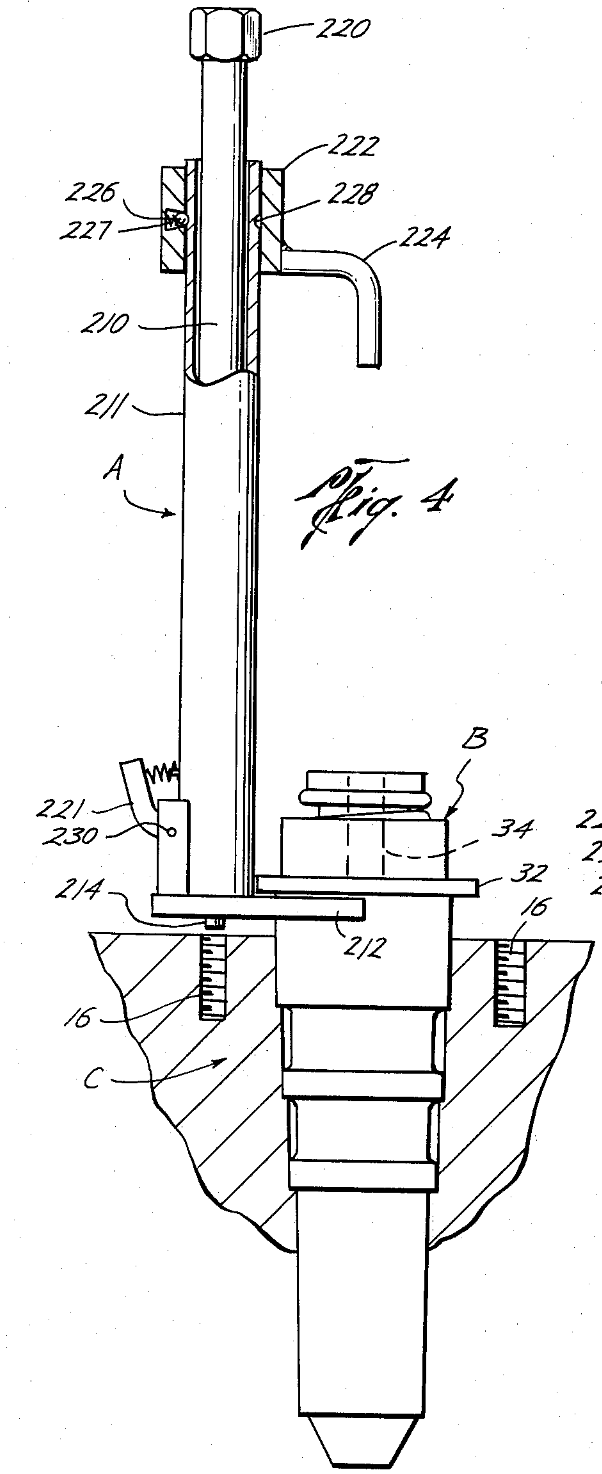
FIG. 4 is a side elevation view, partially in section, illustrating another embodiment of the fuel injector tool.
Figure 5:
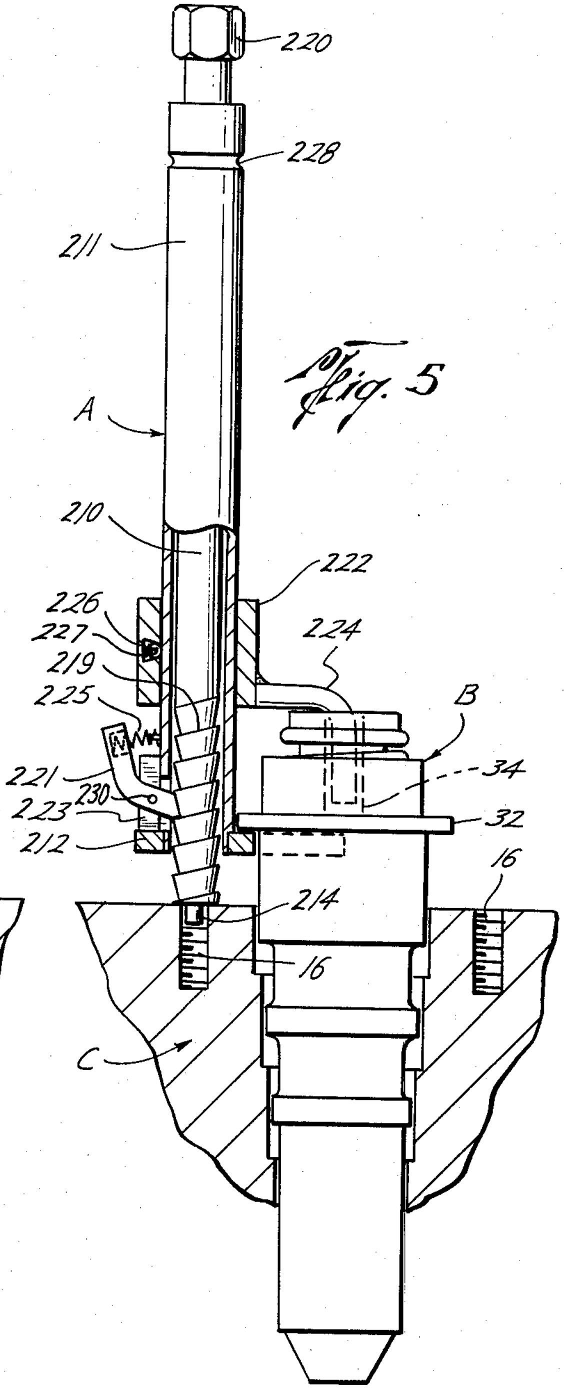
FIG. 5 is a side elevation view, partially in section, also illustrating the embodimwent of FIG. 4.

A third embodiment of the fuel injector tool with the reference characters increased by 200 over the embodiment of FIG. 1 and employing a modified means for moving this elongated member 224 relative to the injector engaging member 212 is illustrated in both FIGS. 4 and 5. The modified means includes a releasable engaging pawl 221 pivotally mounted to spaced mounting extensions or lugs 223 formed on the tubular member 211 by pivot pin 229. The pawl 221 engages helical thread recesses 219 formed in the elongated member 210 for extending the pivot end 214 in the usual manner, as illustrated in FIG. 5. A spring 225 is mounted on pin 230 attached to the tubular member 211 to releasably maintain the pawl 221 in the engaged position with the threads 219. In FIG. 4, the retaining pin 224 is held in the inoperative position, in engagement with the injector B in FIG. 5. Whereas in FIG. 5, the retaining pin 224 has been moved to the operative position of engagement with the injector B.

A fourth embodiment is illustrated in FIGS. 6, 7 and 8. This embodiment is similar to that of FIGS. 4 and 5, but incorporating a different means for moving the lever rod 310 and locating means 314 relative to the injector engaging member 312. As illustrated in FIG. 8, a hollow, square cross section tubular structure 340 is employed, but it should be recognized that a tubular member with a circular cross section may also be utilized. A ball 342 is placed or formed at the second end of the lever rod 310 to provide for gripping by user. A nut, such as that utilized in the other embodiments may also be employed.

An engaging pawl 344, formed preferably out of a spring steel or other similar material, is mounted to the tubular member 340 by means of a bolt 346 so that the pawl 344 engages the recesses 352 on the lever rod 310. A release pin 348, having threads 350 in the middle portion of the release pin 348, is employed to disengage the pawl 344 from the recesses 352 when desired. The positioning of the threads 350 on the release pin 348 and the corresponding threads 351 in the tubular member 340 allow for free movement of the release pin 348 within a limited range, but prevent the release pin 348 from slipping out of the fuel injector tool A.

FIG. 7 illustrates the lever rod 310 and the elongated slot 354 which receives the release pin 348, but enables movement of the lever rod 310 relative to the injector engaging member 312.

OPERATION OF THE INVENTION

In the use and operation of the present invention, the fuel injector tool A is placed in the rocker box so that the injector engaging member 12 will contact the engine C and engage the fuel injector in the desired manner beneath the collar 32 of the fuel injector. The locating means 14 is then lowered by the rotation of the rod 10 relative to the injector engaging member 12 and inserted into one of the bolt holes 16 in the diesel engine. The injector engaging member 12 is then raised relative to the locating means 14 by rotating nut 20 and rod 10 until a snug fit is achieved with the collar 32 of the injector B. In the embodiments of FIGS. 4–8, the elongated member may be pushed down rather than rotated to achieve the same effect.

The locating means 14 becomes a fulcrum by which the fuel injector B is levered free or loose by the mechanic manipulating the rod 10. This may require several adjustments in the position of the injector engaging member 12 relative to the rod 10 by rotating rod 10 as the injector B moves in response to the prying action. After the fuel injector has been manually levered free from the diesel engine C, the sliding collar 22 and attached pin 24 is lowered so that the pin 24 engages the fuel injector through the injector port 34. The sliding collar effectively wedges the fuel injector between the pin 24 and the injector engaging member 12. Consequently, the fuel injector B may easily be lifted out of the crowded rocker box along with the fuel injector tool with a minimum of risk to the mechanic's hands.

The operation of all of the embodiments is essentially the same.

The foregoing disclosure and description of the invention are illustrative and explanatory thereof, and various changes in the size, shape and materials as well as in the details of the illustrated construction may be made without departing from the spirit of the invention.

I claim:

1. A tool for removing fuel injectors from diesel engines comprising:

an elongated member having a first end and a second end;

an injector engaging member fixedly mounted to a tube adapted for receiving the elongated member, said elongated member being movably mounted inside of the tube;

said injector engaging member engageable with the injector between a collar formed on the injector and the diesel engine for prying the injector from the diesel engine;

said first end of the elongated member being engageable with the diesel engine and having a locating means mounted thereon for holding said elongated member in a fixed relationship to the injector;

a pawl on said tube which engages a recess on said elongated member to move said elongated member relative to the injector engaging member for maintaining contact of the injector engaging member with the fuel injector as the fuel injector is pryed loose from the diesel engine.

* * * * *